United States Patent
Cui et al.

(10) Patent No.: US 11,671,992 B2
(45) Date of Patent: Jun. 6, 2023

(54) TRANSMISSION CONFIGURATION INDICATOR (TCI) ACQUISITION MECHANISM FOR SECONDARY CELL ACTIVATION OF A FREQUENCY RANGE 2 (FR2) UNKNOWN CELL

(71) Applicant: Apple Inc., Cupertino, CA (US)

(72) Inventors: Jie Cui, San Jose, CA (US); Yang Tang, San Jose, CA (US); Hong He, San Jose, CA (US); Dawei Zhang, Saratoga, CA (US)

(73) Assignee: APPLE, INC, Cupertino, CA (US)

( * ) Notice: Subject to any disclaimer, the term of this patent is extended or adjusted under 35 U.S.C. 154(b) by 0 days.

(21) Appl. No.: 17/184,043

(22) Filed: Feb. 24, 2021

(65) Prior Publication Data
US 2021/0321405 A1    Oct. 14, 2021

Related U.S. Application Data

(60) Provisional application No. 63/007,234, filed on Apr. 8, 2020.

(51) Int. Cl.
*H04W 72/53*       (2023.01)
*H04B 17/318*      (2015.01)
(Continued)

(52) U.S. Cl.
CPC .......... *H04W 72/53* (2023.01); *H04B 17/318* (2015.01); *H04W 24/10* (2013.01); *H04W 56/001* (2013.01); *H04W 72/046* (2013.01)

(58) Field of Classification Search
CPC ............. H04W 72/0493; H04W 24/10; H04W 56/001; H04W 72/046; H04B 17/318
See application file for complete search history.

(56) References Cited

U.S. PATENT DOCUMENTS

2019/0363809 A1\* 11/2019 Yoon ..................... H04W 56/00
2020/0107337 A1    4/2020 Lin
(Continued)

FOREIGN PATENT DOCUMENTS

WO    WO-2020222279 A1 \* 11/2020    ........... H04B 17/336
WO    WO-2021064200 A1 \* 4/2021     ............. H04L 5/001

OTHER PUBLICATIONS

Extended European Search Report on the Patentability of Application No. 21164716.9-1212 dated May 8, 2021, 14 pages.
(Continued)

*Primary Examiner* — Deepa Belur
(74) *Attorney, Agent, or Firm* — Womble Bond Dickinson (US) LLP

(57) ABSTRACT

A method and apparatus of a device that acquires transmission configuration indicator (TCI) information for secondary cell (SCell) activation. In some embodiments, the TCI information is acquired for SCell activation by determining, during secondary cell (SCell) activation, that beam information to enable a user equipment (UE) to make a reliable layer 1 (L1)-Reference Signal Received Power (RSRP) measurement report is unavailable, perform the L1-RSRP measurement using information of one or more Synchronization Signal Blocks (SSBs) during the SCell activation, wherein the one or more processors perform the L1-RSRP measurement using information of one or more SSBs during the SCell activation by identifying, by the UE, one or more detectable SSBs during the SCell activation and using information of the one or more detectable SSBs for the L1-RSRP measurement.

20 Claims, 13 Drawing Sheets

(51) Int. Cl.
    *H04W 24/10*    (2009.01)
    *H04W 56/00*    (2009.01)
    *H04W 72/044*   (2023.01)

(56) References Cited

U.S. PATENT DOCUMENTS

2021/0068123 A1* 3/2021 Zhu .................. H04L 43/08
2021/0258062 A1* 8/2021 Koskela ............. H04W 80/02
2021/0337497 A1* 10/2021 Siomina ............. H04J 11/0079
2022/0255617 A1* 8/2022 Yang ................. H04L 27/26025

OTHER PUBLICATIONS

Intel Corporation: "Discussion on SCel I activation delay in FR2", 3GPP Draft; R4-1905761 NR SCELL Activation in FR2 V6 CL, 3rd Generation Partnership Project (3GPP), May 3, 2019 (May 3, 2019), 6 pages.
Eri cs son: "On LI-RSRP reporting and TCI state activation at SCell activation", 3GPP Draft; R4-1906888 on LI-RSRP Reporting and TC! State Activation at Scell Activation, 3rd Generation Partnership Project (3GPP), May 13, 2019 (May 13, 2019), 4 pages.
NEC: "SCel I activation delay in FR2 band", 3GPP Draft; R4-1903622, 3rd Generation Partnership Project (3GPP), Apr. 1, 2019 (Apr. 1, 2019), 5 pages.
Ualcomm Incorporated: "Discussion on see 11 Activation Timel ine in FR2", 3GPP Draft; R4-1906985 Discussion on SC ELL Activation Ti meline in FR2, 3rd Generation Partnership Project (3GPP), May 13, 2019 (May 13, 2019), 4 pages.

* cited by examiner

US 11,671,992 B2

TRANSMISSION CONFIGURATION INDICATOR (TCI) ACQUISITION MECHANISM FOR SECONDARY CELL ACTIVATION OF A FREQUENCY RANGE 2 (FR2) UNKNOWN CELL

RELATED APPLICATION

The present application is a non-provisional application of and claims the benefit of U.S. Provisional Patent Application No. 63/007,234, filed Apr. 8, 2020 and entitled "Transmission Configuration Indicator (TCI) Acquisition Mechanism for Secondary Cell Activation of a Frequency Range 2 (FR2) Unknown Cell", which is incorporated by reference in its entirety.

FIELD OF INVENTION

Embodiments relates generally to wireless technology and more particularly to the transmission configuration indicator (TCI) information for secondary cell (SCell) activation in a wireless communication system.

BACKGROUND

Wireless communication systems provide various telecommunication services and typically employ multiple-access technologies capable of supporting communication with multiple users by sharing available system resources. Multiple-access technologies include, for example, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol for enabling different wireless devices to communicate. One such standard is $5^{th}$ Generation (5G) New Radio (NR), which includes some aspects that may be based on the Long-Term Evolution (LTE) standard. However, further advancements are still needed in the technology for 5G NR.

One such aspect involves the activation delay related to a secondary cell (SCell) in cases where a SCell being activated belongs to Frequency Range 2 (FR2) and if there is no active serving cell on that FR2 band provided that a primary cell (PCell) or primary secondary cell (PSCell) is Frequency Range 1 (FR1). In the activation procedure, beam information (e.g., the transmission configuration indicator (TCI) information) used for Layer 1 (L1)-Reference Signal Received Power (RSRP) reporting (L1-RSRP) reference signal (RS) is unknown to the user equipment (UE). In such a case, the network may not configure any TCI information for L1-RSRP RS before beginning the process of activating the SCell or may configure TCI information for L1-RSRP RS beginning the process of activating the SCell, but that TCI related information was made a long time ago and is now out of date. Without precise TCI information, the UE cannot perform a reliable L1-RSRP, thereby making the L1-RSRP report unreliable. If the L1-RSRP is unreliable, the process of SCell activation for an FR2 unknown cell is delayed.

SUMMARY OF THE DESCRIPTION

A method and apparatus of a device that acquires transmission configuration indicator (TCI) information for secondary cell (SCell) activation. In some embodiments, the TCI information is acquired for SCell activation by: determining, during secondary cell (SCell) activation, that beam information (e.g., TCI information) to enable a user equipment (UE) to make a reliable layer 1 (L1)-Reference Signal Received Power (RSRP) measurement report is unavailable; performing the L1-RSRP measurement using information of one or more Synchronization Signal Blocks (SSBs) during the SCell activation, wherein the one or more processors perform the L1-RSRP measurement using information of one or more SSBs during the SCell activation by identifying, by the UE, one or more detectable SSBs during the SCell activation and using information of the one or more detectable SSBs for the L1-RSRP measurement, and reporting, by the UE after SCell synchronization, alternative information in the L1-RSRP measurement report for the SCell activation as a replacement when the beam information to enable the UE to make the reliable L1-RSRP measurement report is unavailable.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a device that acquires beam information (e.g., transmission configuration indicator (TCI) information) for secondary cell (SCell) activation when the beam information to enable a user equipment (UE) to make a reliable beam measurement report is unavailable. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

Figure 1:
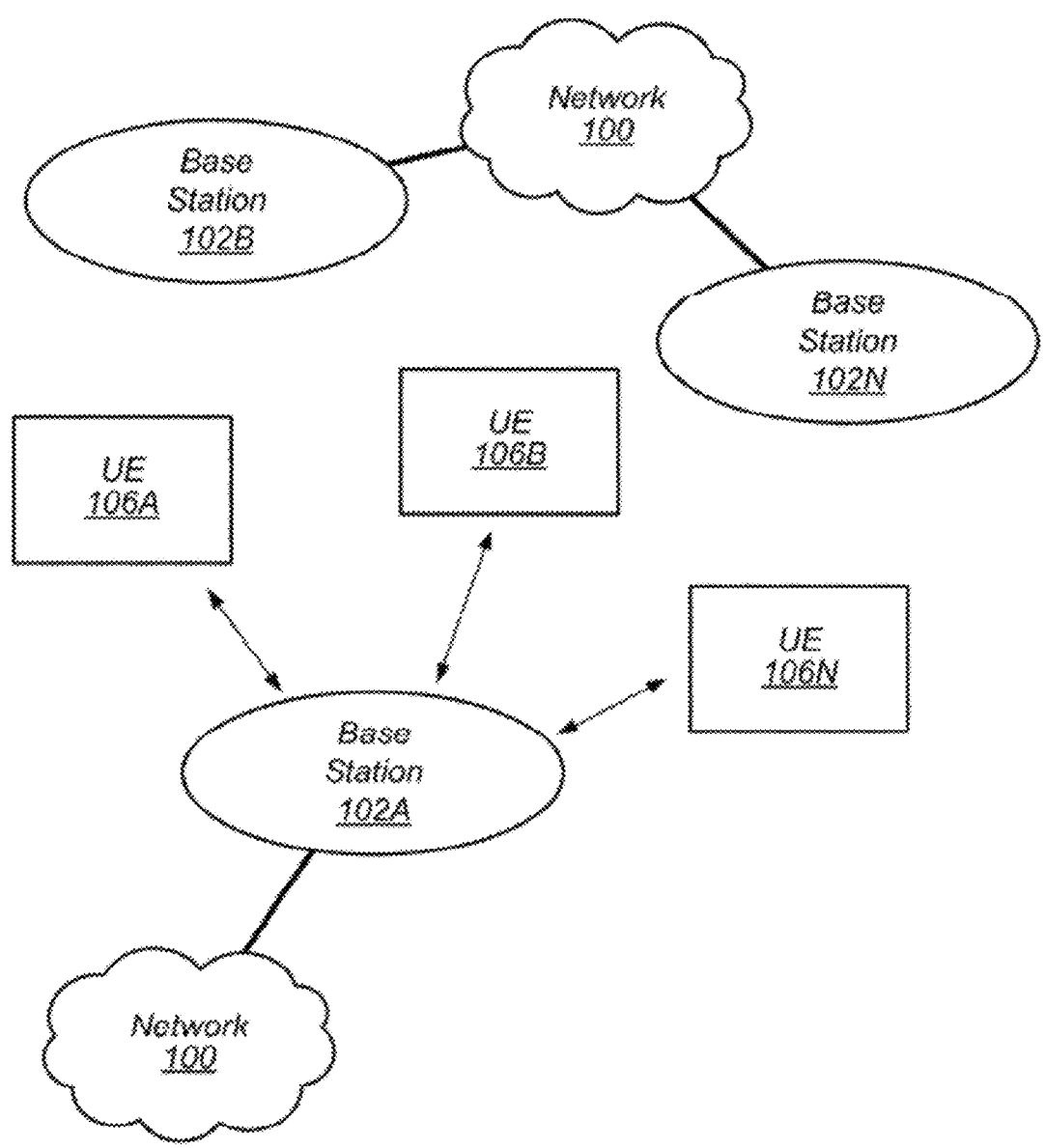
FIG. 1 illustrates an example wireless communication system according to some embodiments.

A method and apparatus of a device that acquires beam information (e.g., transmission configuration indicator (TCI) information) for secondary cell (SCell) activation when the beam information to enable a user equipment (UE) to make a reliable beam measurement report is unavailable. In some embodiments, the beam measurement report is a layer 1 (L1)-Reference Signal Received Power (RSRP) measurement report and the UE uses alternative information for the L1-RSRP report when the beam information is unavailable. The UE reports the alternative information in the L1-RSRP measurement report for the SCell activation as a replacement when the beam information to enable the UE to make the reliable L1-RSRP measurement report is unavailable FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
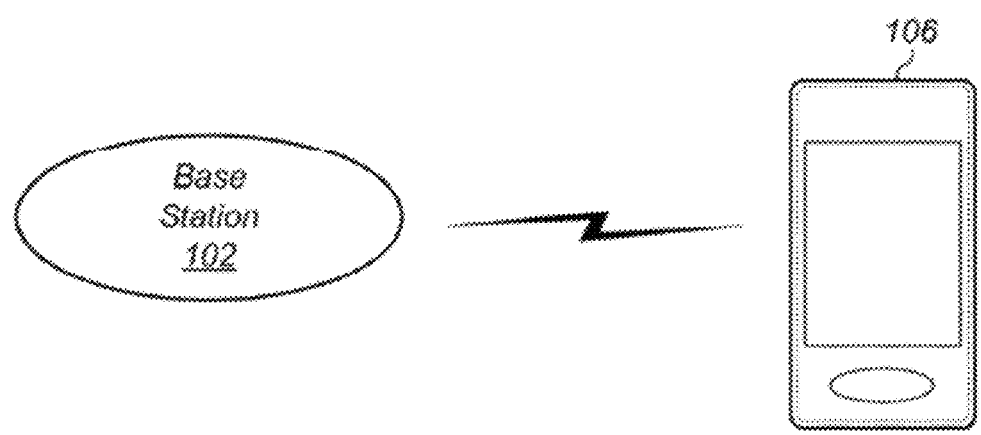
FIG. 2 illustrates a base station (BS) in communication with a user equipment (UE) device according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
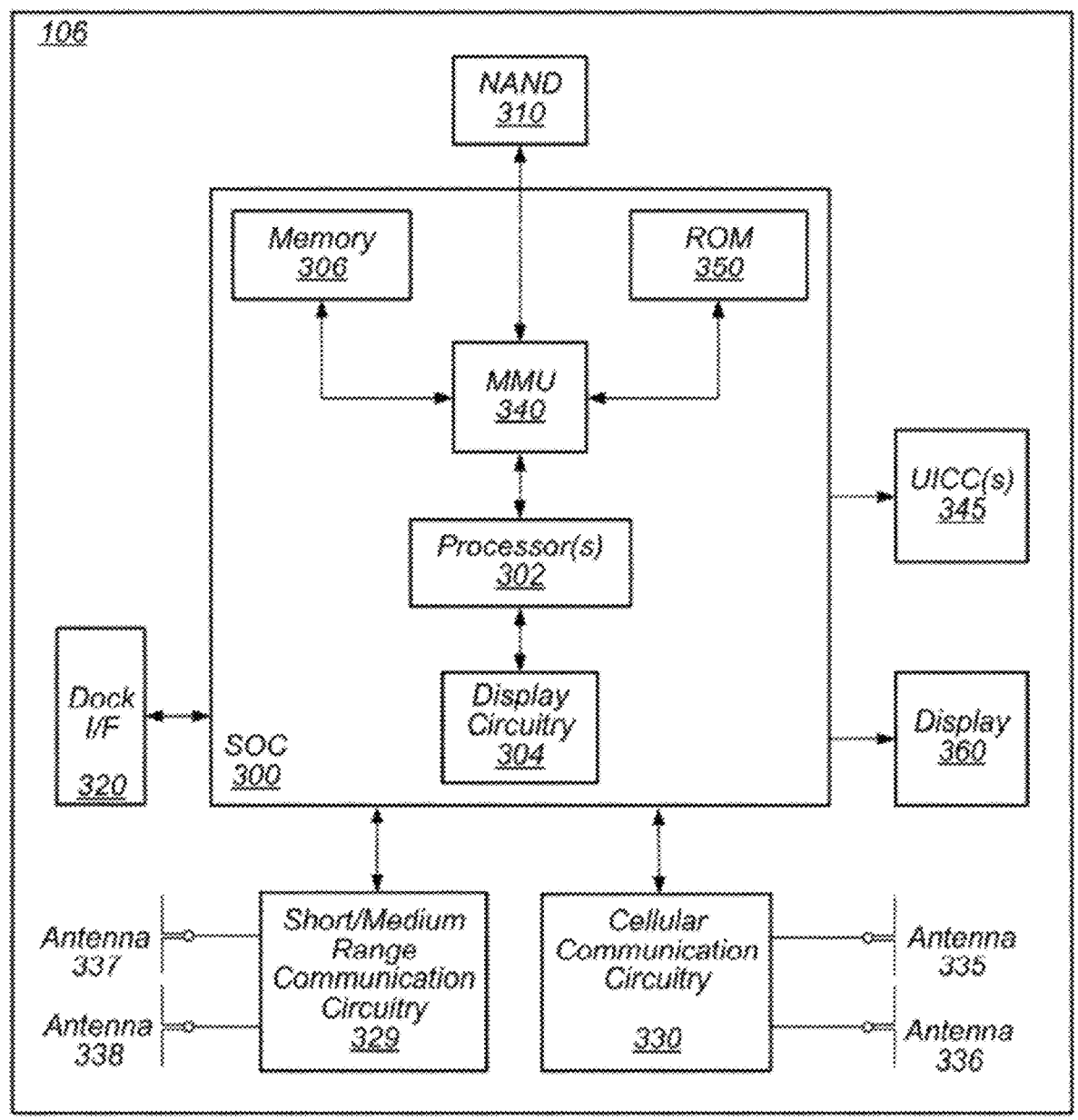
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly, dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing the above features for enabling UE to perform L1-RSRP measurements for beam reporting during SCell activation when the UE does not have precise (and reliable) TCI information available and provides that alternative information as part of the L1-RSRP reporting during SCell activation, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short-range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short-range wireless communication circuitry 329 may include one or more ICs that are configured to perform the functions of short-range wireless communication circuitry 32. In addition, each integrated circuit may include circuitry (e.g., first circuitry, second circuitry, etc.) configured to perform the functions of short-range wireless communication circuitry 329.

Figure 4:
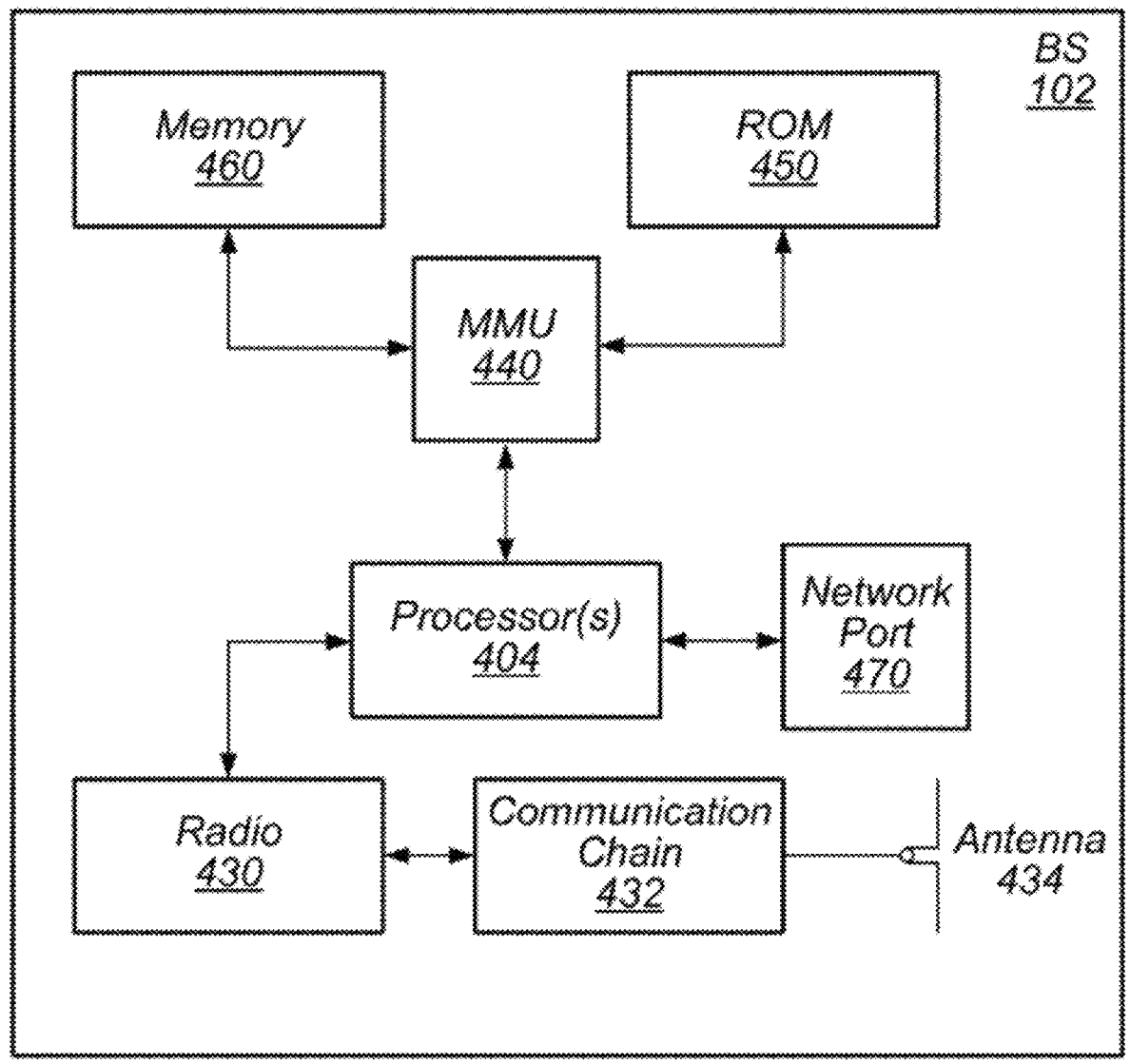
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
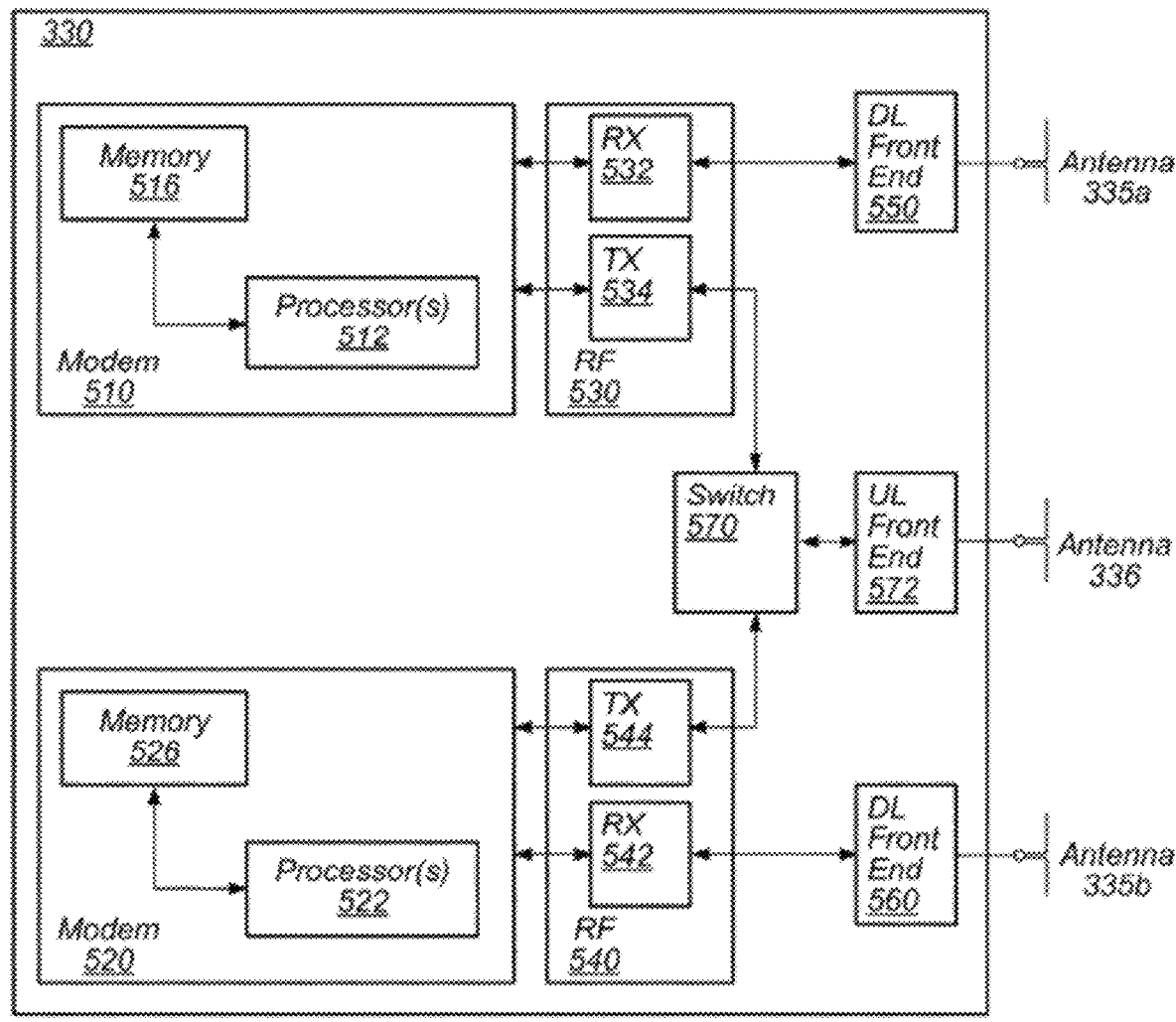
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for enabling UE to perform L1-RSRP measurements for beam reporting during SCell activation when the UE does not have precise (and reliable) TCI information available and provides that alternative information as part of the L1-RSRP reporting during SCell activation, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition)

the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for enabling UE to perform L1-RSRP measurements for beam reporting during SCell activation when the UE does not have precise (and reliable) TCI information available and provides that alternative information as part of the L1-RSRP reporting during SCell activation, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

TCI Acquisition for Secondary Cell (SCell) Activation

In some embodiments, SCell activation and deactivation are used to activate or deactivate, respectively, data transmission between a UE and a SCell. In some embodiments, this occurs while the SCell is in carrier aggregation. Note that this occurs in one or more wireless standards including, for example, 5G NR. In some embodiments, the carrier aggregation is set up by a Radio Resource Control (RRC) process, and after the RRC process has finished, the data transmission is switched on/off by the UE to facilitate activation/deactivation of the SCell. The time to complete the SCell activation is based on a number of different factors and the SCell activation may be delayed for one or more reasons.

For example, in the 5G NR standard, when SCell occurs for an unknown Frequency Range 2 (FR2) SCell, there may be a FR2 SCell activation delay. In some embodiments, the delay is specified as based on whether the SCell being activated belongs to FR2 and whether there is no active serving cell on that FR2 band provided that PCell or PSCell is Frequency Range 1 (FR1). In other words, in some embodiments, the FR2 SCell activation delay is based on whether the target SCell is known to the UE.

If the target SCell is unknown to UE and semi-persistent channel state information (CSI)-reference signal (RS) is used for CSI reporting, provided that the side condition Ês/Iot≥[−2]dB is fulfilled, then SCell activation time, $T_{activation\_time}$, may be represented as:

$$8 \text{ ms} + 24 * T_{rs} + T_{uncertainty\_MAC} + T_{L1\text{-}RSRP,measure} + T_{L1\text{-}RSRP,report} + T_{HARQ} + T_{FineTiming}$$

and if the target SCell is unknown to UE and periodic CSI-RS is used for CSI reporting, provided that the side condition Ês/Iot≥[−2]dB is fulfilled, then $T_{activacion\_time}$ is:

$$3 \text{ ms} + 24 * T_{rs} + T_{L1\text{-}RSRP,measure} + T_{L1\text{-}RSRP,report} + \max\{ \\ (T_{HARQ} + T_{uncertainty\_MAC} + 5 \text{ ms} + T_{FineTiming}), \\ (T_{uncertainty\_RRC} + T_{RRC\_delay})\},$$

where

1) $T_{rs}$ is the SMTC periodicity of the SCell being activated if the UE has been provided with an SMTC configuration for the SCell in SCell addition message; otherwise $T_{rs}$ is the SMTC configured in the measObjectNR having the same SSB frequency and subcarrier spacing. If the UE is not provided SMTC configuration or measurement object on this frequency, the requirement which involves $T_{rs}$ is applied with $T_{rs}$=5 ms assuming the SSB transmission periodicity is 5 ms. There is no requirements if the SSB transmission periodicity is not 5 ms 2) $T_{FineTiming}$ is the time period between UE finish processing the last activation command for PDCCH TCI, PDSCH TCI (when applicable) and semi-persistent CSI-RS (when applicable) and the timing of first complete available SSB corresponding to the TCI state.

3) $T_{L1\text{-}RSRP,measure}$ is L1-RSRP measurement delay $T_{L1\text{-}RSRP\_Measurement\_Period\_SSB}$ (ms) or $T_{L1\text{-}RSRP\_Measurement\_Period\_CSI\text{-}RS}$ based on applicability as defined in TS38.133 clause 9.5 assuming M=1.

4) $T_{L1\text{-}RSRP,report}$ is delay of acquiring CSI reporting resources.

5) $T_{uncertainty\_MAC}$ is the time period between reception of the last activation command for PDCCH TCI, PDSCH TCI (when applicable) and semi-persistent CSI-RS for CQI reporting (when applicable) relative to
   a. SCell activation command for known case;
   b. First valid L1-RSRP reporting for unknown case.

6) $T_{uncertainity\_RRC}$ is the time period between reception of the RRC configuration message for TCI of periodic CSI-RS for CQI reporting (when applicable) relative to
   a. SCell activation command for known case;
   b. First valid L1-RSRP reporting for unknown case.

7) $T_{RRC\_delay}$ is the RRC procedure delay as specified in TS38.331 of 5G NR.

8) $T_{HARQ}$ (in ms) is the timing between DL data transmission and acknowledgement as specified in TS 38.211

One problem in the activation procedure is that the TCI information for L1-RSRP RS may be unknown to the UE. If that occurs, the network may not configure any TCI information for L1-RSRP RS before the SCell activation begins or the network may configure TCI information for L1-RSRP RS before the SCell activation begins, but that TCI-related measurement was long time ago and now is out of date. In these cases, the UE needs to obtain the TCI for L1-RSRP after cell synchronization. This problem may be better understood by explaining a SCell activation process.

Figure 6:
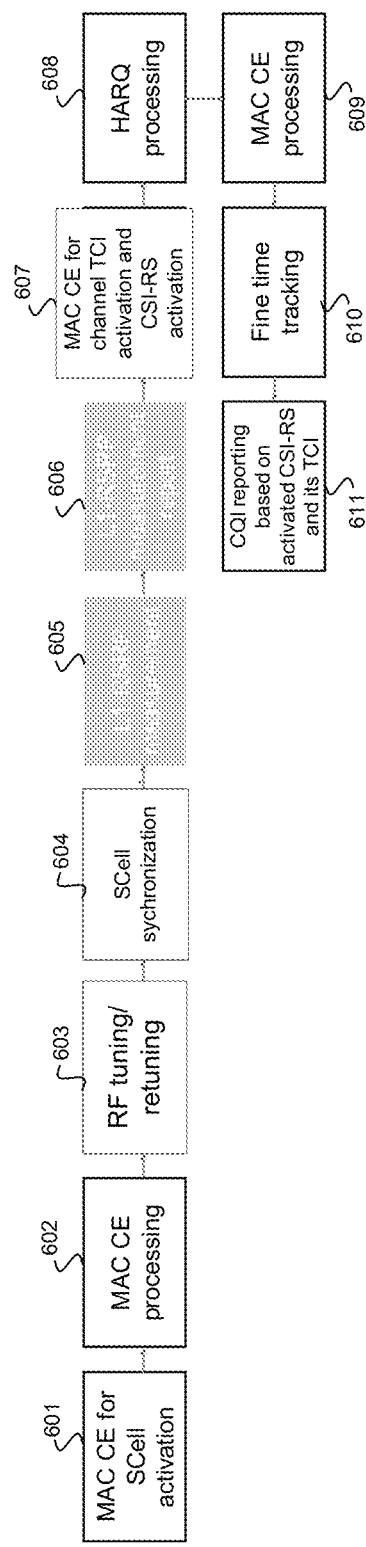
FIG. 6 is a data flow diagram of a SCell activation process according to some embodiments.

FIG. 6 is a data flow diagram of a SCell activation process according to some embodiments. In some embodiments, the activation process occurs after the SCell has been added to the UE.

Referring to FIG. 6, the SCell activation process begins by the UE receiving a MAC control element (CE) command in a message from the network to activate an SCell (processing block 601) and decodes the message to determine that a targeted SCell is to be activated (processing block 602).

After decoding the message, the UE begins the process of activating the SCell by tuning (or retuning) its RF to the new SCell (processing block 603). The tuning operation ensures that the UE's RF filter covers the new SCell. Once tuning has been completed, the UE performs SCell synchronization. During SCell synchronization, the UE synchronizes with the target SCell to obtain timing information needed for communication (processing block 604). In some embodiments, this timing information comprises frame boundary and symbol boundary information.

After synching to the SCell, the UE performs L1-RSRP measurements that can be used by the network to identify the best beam pair to use to enable to support channel state information (CSI) reporting for the UE (processing block 605). During the measurement process, UE changes the receive beam itself and takes L1-RSRP measurements that can be reported to the network. After performing the L1-RSRP measurements, the UE knows the best receive beam that it can use with the SCell to receive one of the SS blocks for which it measured. However, this process assumes that the UE has been configured with the TCI information that provides beam information that the UE uses for the measurements. Without precise TCI information, the UE cannot perform reliable L1-RSRP measurements and thus makes any reporting of such measurements unreliable. However, there are times when the TCI information for the L1-RSRP RS is unknown to the UE. As discussed above, the UE does not have reliable TCI information if the SCell being activated, referred to herein as the target SCell, belongs to FR2 and if there is not active serving cell on that FR2 band provided that PCell or PSCell is FR1. The UE also does not have reliable TCI information if the target SCell is unknown to the UE and either semi-persistent CSI-RS or periodic CSI-RS is used for CSI reporting.

After the UE has completed the measurements, the UE sends a L1-RSRP measurement report to the network (processing block 606). In some embodiments, this report includes the measurements of all SSBs for which the UE made measurements. After sending the report, the network knows the reference signal that is best to use as it indicates the SS block with the highest response for the UE. In some embodiments, the report specifies information (e.g., an index) identifying the best SS block based on the measured RSRP for the particular SS block. Using this information, the network can determine the transmit (Tx) beam that the network should use to transmit the CSI, as well as the SS block, to the UE. Thus, the L1-RSRP measurement report allows the UE and the network to know the best receive and transmit pair to use for the link between the UE and the SCell.

Once the network has the beam information, the network configures the UE for the CQI reporting resource, or reference signal, and the CSI-RS using the best beam pair. This is done by the network sending sends MAC CE command messages that are received by the UE (processing block 607). Subsequently, HARQ processing (processing block 608) and the MAC CE processing (processing block 608) decode and execute those commands to activate the channel TCI and CSI-RS for the UE. Note that even though the UE does not provide usable CQI until after SCell activation has been completed, the UE has been providing CQI during the SCell activation process since RF turning of processing block 603 but this reported CQI only indicates that the UE is out of range of the SCell. The UE keeps reporting the CQI indicating an out of range status until finished activation After decoding and beginning the execution of the commands for activating the channel TCI and the CSI-RS, the UE performs fine time tracking (processing block 610). In some embodiments, the fine time tracking performs time frequency checking to obtain a timing frequency offset of the target reference signal.

Thereafter, the UE activates the CQI reporting based on the activated CSI-RS (processing block 611). This enables the UE to take measurements of the CQI of targeted CSI-RS and report them.

Thus, as set forth above, because the UE does not have precise TCI information, the UE cannot perform a reliable L1-RSRP measurements for beam reporting, thereby making the L1-RSRP report from the UE unreliable. In some embodiments, the UE uses alternative information as a replacement to LI-RSRP measurements when precise (and reliable) TCI information is not available and provides that alternative information as part of the L1-RSRP reporting during SCell activation.

Figure 7:
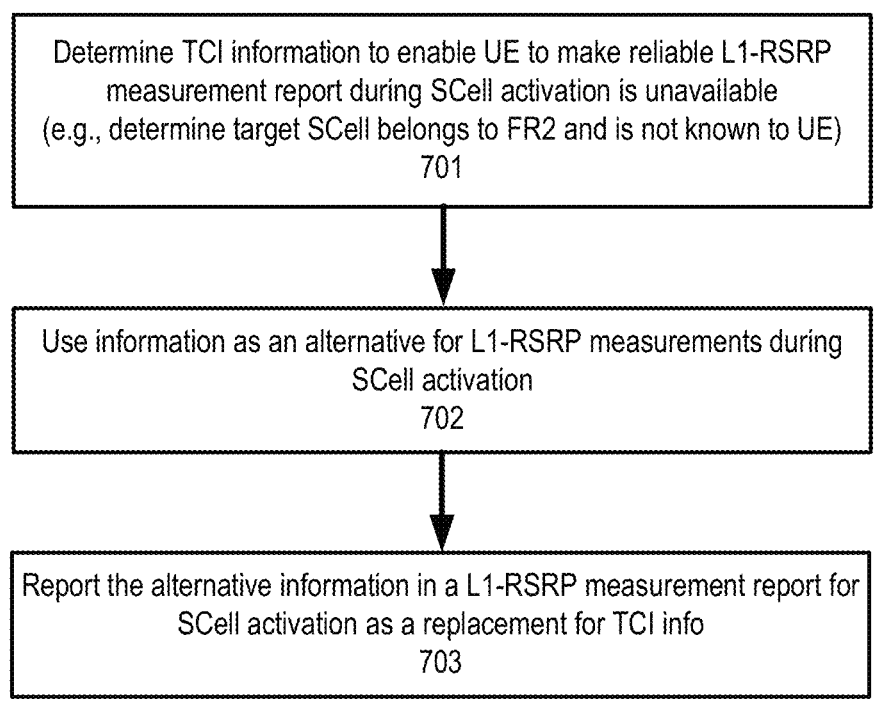
FIG. 7 is a flow diagram of a process for using alternative information in the L1-RSRP reporting during SCell activation.

FIG. 7 is a flow diagram of a process for using alternative information in the L1-RSRP reporting during SCell activation. Referring to FIG. 7, the process includes determining, during secondary cell (SCell) activation, that beam information to enable a user equipment (UE) to make a reliable L1-RSRP measurement is unavailable (processing block 701). In some embodiments, the beam information that is not available is reliable TCI information (e.g., TCI information of a certain quality level to make a reliable L1-RSRP measurement report). In response to this determination, alternative information in used by the UE for the L1-RSRP measurements during SCell activation (processing block 702). In some embodiments, this information is obtained after SCell synchronization. Thereafter, the UE reports the alternative information in a L1-RSRP measurement report for the SCell activation as a replacement when the beam information to enable the UE to make a reliable L1-RSRP measurement is unavailable (processing block 703).

In some embodiments, the beam information to enable the UE to make the reliable L1-RSRP measurement report is unavailable when the SCell being activated belongs to Frequency Range 2 (FR2) and that the SCell is unknown to the UE, and in that case the alternative information is provided in the L1-RSRP measurement report as the replacement.

In some embodiments, the replacement information comprises information of one or more Synchronization Signal Blocks (SSBs), and the reporting of the alternative information comprises reporting the information of the one or more SSBs as the replacement. In another embodiment, the alternative information comprise L1-RSRP measurements based on L3 SSB measurement information, and the reporting of the alternative information comprises reporting L1-RSRP measurements based on L3 SSB measurement information as the replacement. In yet another embodiment, the alternative information is related to preconfigured TCI information for L1-RSRP that is preconfigured by a network as part of the SCell activation process, and the preconfigured TCI information is used for L1-RSRP measurements.

As discussed above, in some embodiments, the alternative information used by the UE using information from Synchronization Signal Blocks (SSBs) for the L1-RSRP measurement. That is, the UE uses an SSB-based L1-RSRP measurement during SCell activation. In some embodiments, the UE uses SSBs that are used for SCell synchronization when the UE is synchronizing with the target SCell.

In some embodiments, if the SCell being activated belongs to FR2 and if there is no active serving cell on that FR2 band provided that PCell or PSCell is FR1 and if the target SCell is unknown to UE and either semi-persistent CSI-RS or periodic CSI-RS is used for CSI reporting, then the UE uses only SSBs to perform the L1-RSRP measurement during the current SCell activation. In some embodiments, these SSBs are the ones used for SCell synchronization in the current SCell activation.

Figure 8:
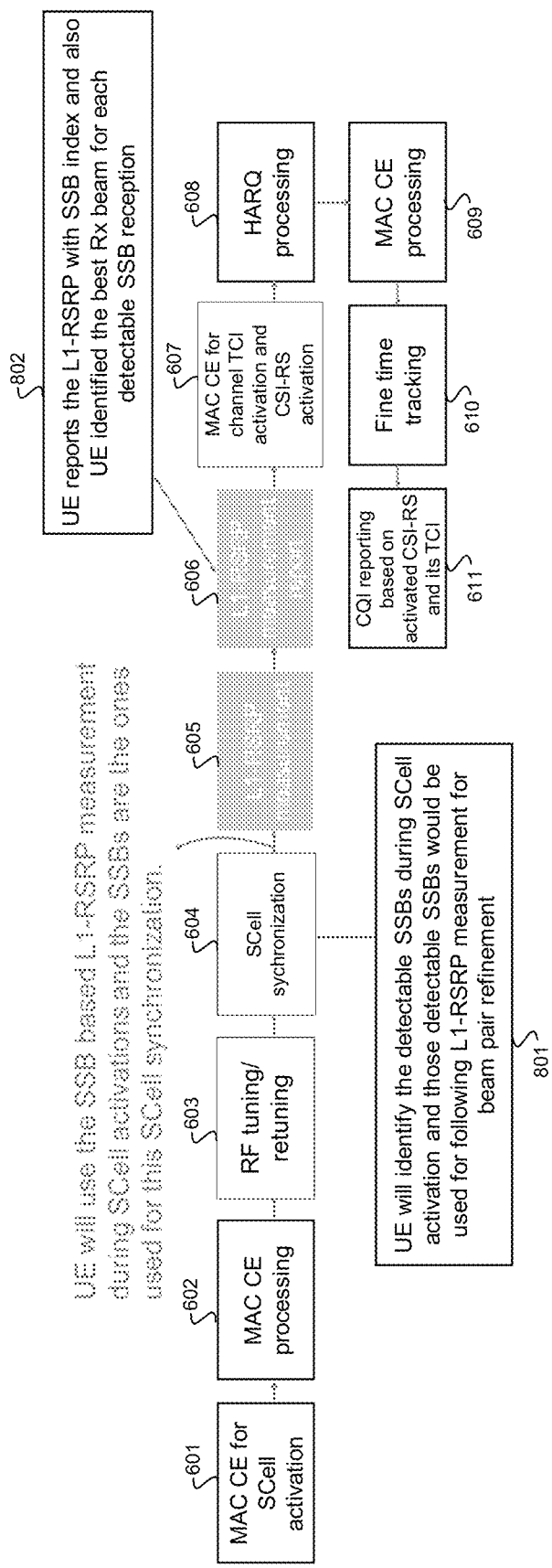
FIG. 8 is a data flow diagram of some embodiments of a SCell activation process that uses using detectable SSBs detected for the L1-RSRP measurement report when reliable beam information (e.g., TCI information) is not available for L1-RSRP measurements.

FIG. 8 is a data flow diagram of some embodiments of a SCell activation process that uses detectable SSBs detected for the L1-RSRP measurement report when reliable beam information (e.g., TCI information) is not available for L1-RSRP measurements. The process of FIG. 8 is the same as that of FIG. 6 except where as shown and discussed herein.

Referring to FIG. 8, in some embodiments, during the SCell synchronization portion of SCell activation, the UE identifies detectable SSBs (processing block 801). The UE uses the SSBs that are detected for the L1-RSRP measurement for beam pair refinement. Thereafter, the UE reports the L1-RSRP measurements for the SSBs (processing block 801). In some embodiments, one or more SSBs that were not detected will still have a measurement reported. In some embodiments, the measurement is reported as zero or some other information is provided to indicate that the beams associated with the SSB should not be used for communication between the UE and the target SCell. In some embodiments, the L1-RSRP report identifies the best receive beam for each detectable SSB reception.

Figure 9:
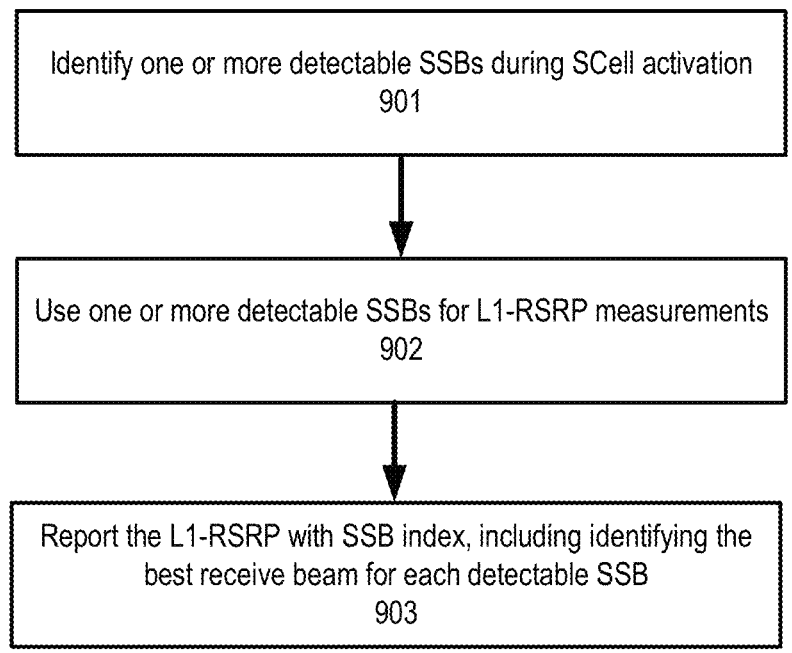
FIG. 9 is a flow diagram of the process of using detectable SSBs that are detected for the L1-RSRP measurement in the SCell activation process when reliable beam information (e.g., TCI information) is not available for L1-RSRP measurements during SCell activation.

FIG. 9 is a flow diagram of the process of using detectable SSBs that are detected for the L1-RSRP measurement in the SCell activation process when reliable beam information (e.g., TCI information) is not available for L1-RSRP measurements during SCell activation.

Figure 10:
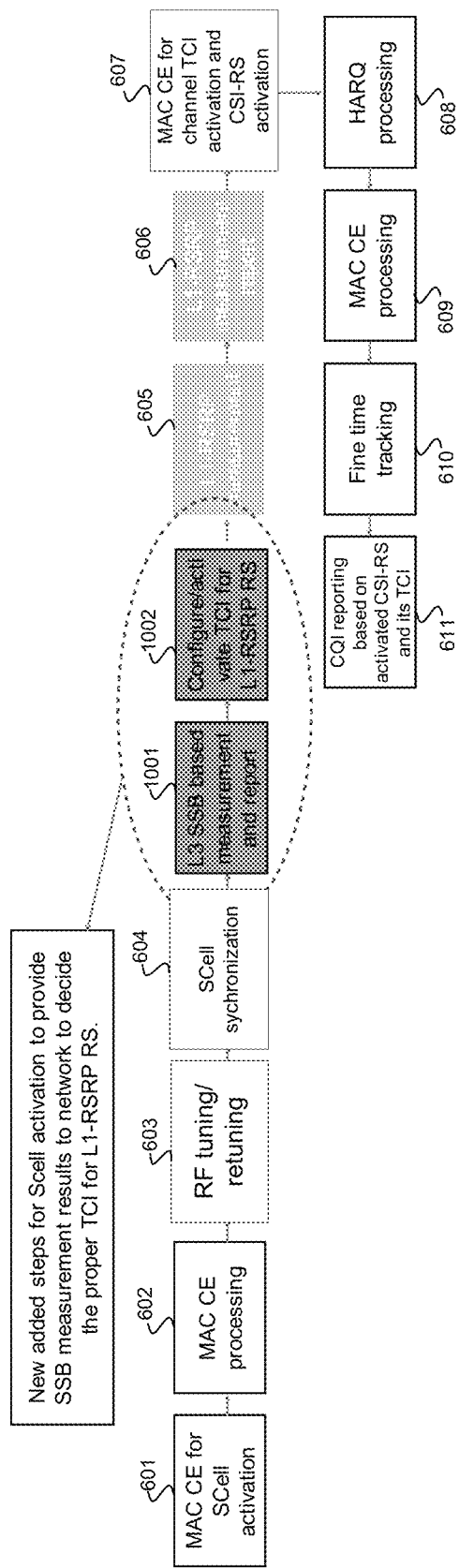
FIG. 10 is a data flow diagram of some embodiments of a SCell activation process that uses L3 SSB measurements made during SCell activation to create TCI that is used for L1-RSRP when reliable beam information (e.g., TCI information) is not available for L1-RSRP measurements during SCell activation.

In some embodiments, in place of TCI information that is available when the SCell activation process starts, the UE uses L1-RSRP RS TCI that is based on the layer three (L3) SSB measurements. FIG. 10 is a data flow diagram of some embodiments of a SCell activation process that uses L3 SSB measurements made during SCell activation to create TCI that is used for L1-RSRP when reliable beam information (e.g., TCI information) is not available for L1-RSRP measurements during SCell activation. The process of FIG. 10 is the same as that of FIG. 6 except where as shown and discussed herein.

Referring to FIG. 10, in some embodiments, the SCell activation process includes additional operations to provide SSB measurement results to the network that are used by the network to determine the proper TCI for the L1-RSRP RS measurements. More specifically, after SCell synchronization, the UE performs a process to perform L3 SSB measurements and reports the results to the network (processing block 1001). As part of the L3 SSB measurement, the UE measures the detected SSBs in the SCell synchronization step and reports the measurement results with an SSB index to the network. In some embodiments, this measurement is requested by network. Then, the UE waits for the network to configure or otherwise activate the TCI that enables the UE to perform L1-RSRP measurements and L1-RSRP measurement reporting to the network. Thus, after received the L3 SSB-based measurement from the UE, the network configures or activates proper TCI for L1-RSRP RS based on the SSB measurement (processing block 1002). In some embodiments, the L1-RSRP RS is a QCL type D with certain SSBs.

Figure 11:
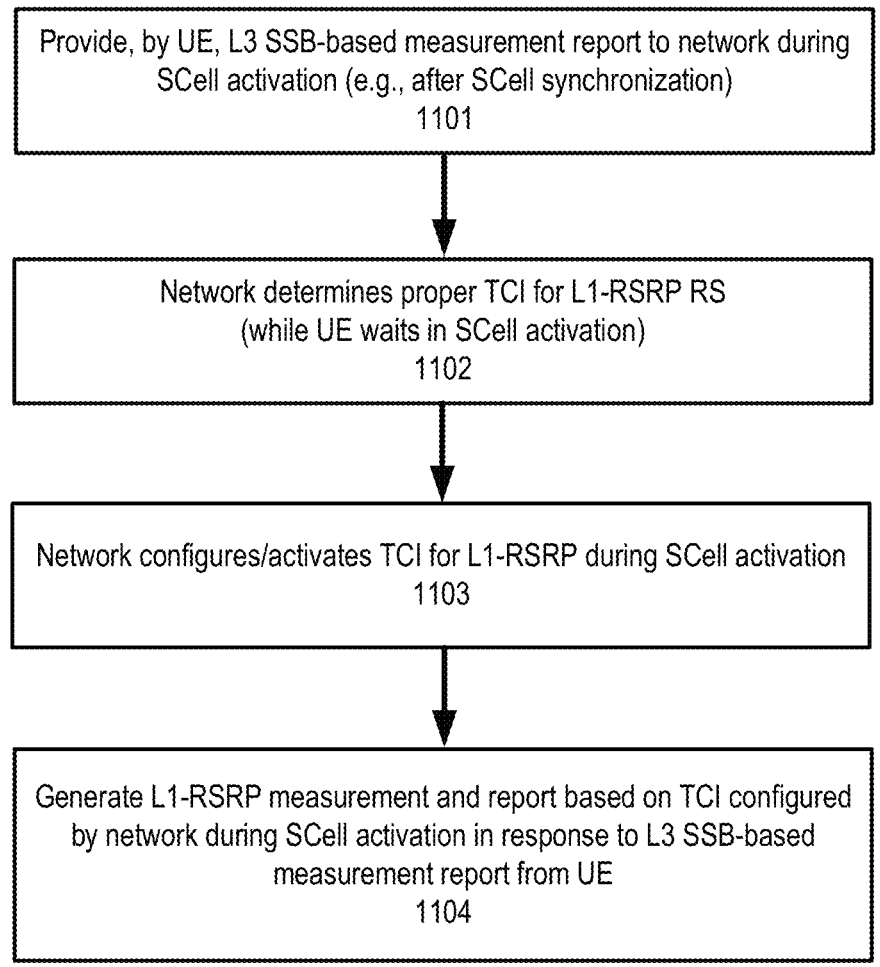
FIG. 11 is a flow diagram of the process of using L3 SSB measurement and reporting for configuring the UE with TCI during SCell activation to enable the UE to perform L1-RSRP measurement and reporting during the SCell activation process when reliable beam information (e.g., TCI information) is not available for L1-RSRP measurements during SCell activation.

FIG. 11 is a flow diagram of the process of using L3 SSB measurement and reporting for configuring the UE with TCI during SCell activation to enable the UE to perform L1-RSRP measurement and reporting during the SCell activation process when reliable beam information (e.g., TCI information) is not available for L1-RSRP measurements during SCell activation.

Figure 12:
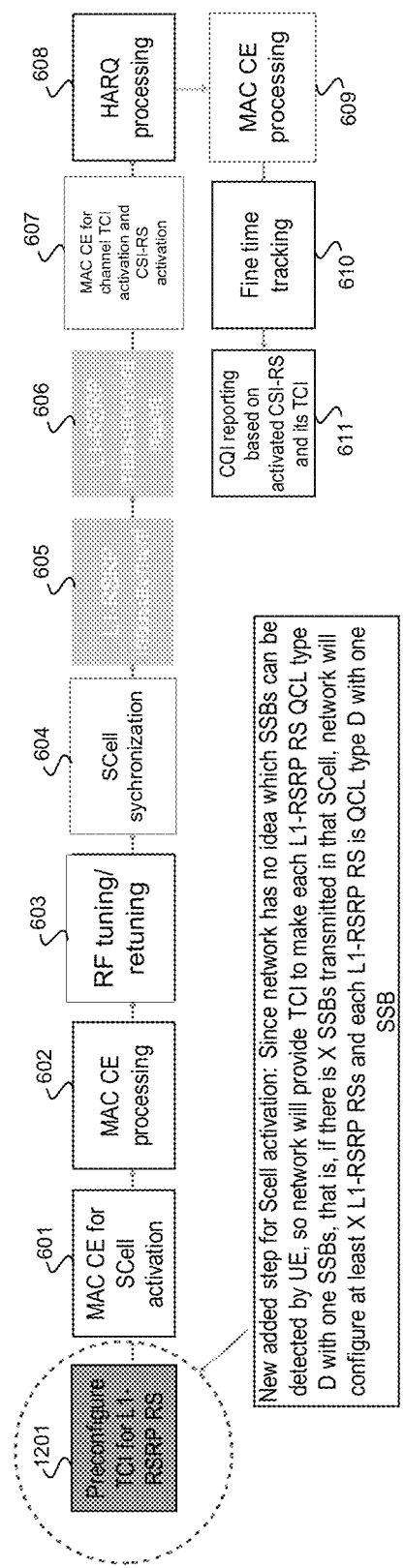
FIG. 12 is a data flow diagram of some embodiments of a SCell activation process that uses preconfigures beam information (e.g., TCI information) for RSRP RS during SCell activation to provide TCI that is used for L1-RSRP when reliable beam information (e.g., TCI information) is not available for L1-RSRP measurements during SCell activation.

In some embodiments, the SCell activation process is augmented to preconfigure TCI information for all L1-RSRP RS. FIG. 12 is a data flow diagram of some embodiments of a SCell activation process that uses preconfigures beam information (e.g., TCI information) for RSRP RS during SCell activation to provide TCI that is used for L1-RSRP when reliable beam information (e.g., TCI information) is not available for L1-RSRP measurements during SCell activation. The process of FIG. 12 is the same as that of FIG. 6 except where as shown and discussed herein.

Referring to FIG. 12, in some embodiments, the network preconfigures TCIs for each L1-RSRP RS (processing block 1201). In some embodiments, the network preconfigures TCIs for each L1-RSRP RS where the number of L1-RSRP RS is not less than the number of SSBs transmitted in that SCell. Thus, if there is a predetermined number of SSBs (e.g., greater than zero) transmitted in that SCell, then the network configure at least that same number of L1-RSRP RSs. In some embodiments, each of those L1-RSRP RS is a QCL type D with one SSB.

Figure 13:
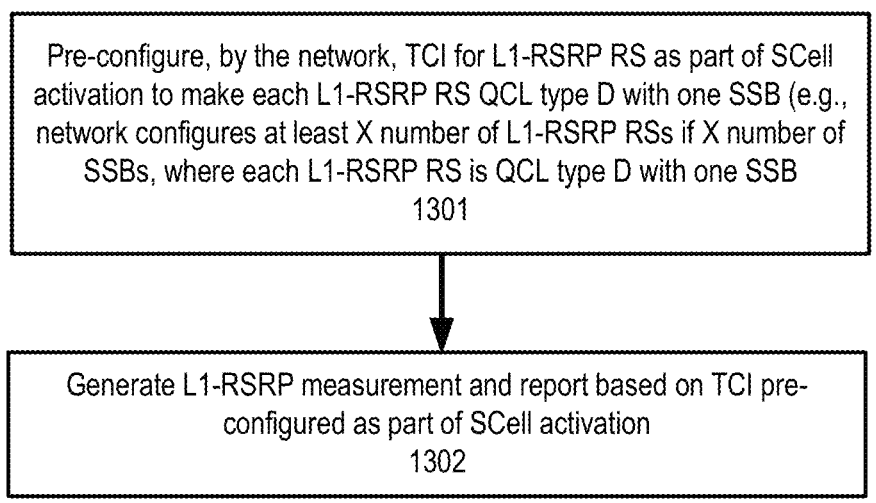
FIG. 13 is a flow diagram of the process of pre-configuring a UE with beam information (e.g., TCI information) during SCell activation for the UE to perform L1-RSRP measurement and reporting during the SCell activation process when reliable beam information (e.g., TCI information) is not available for L1-RSRP measurements during SCell activation.

FIG. 13 is a flow diagram of the process of pre-configuring a UE with beam information (e.g., TCI information) during SCell activation for the UE to perform L1-RSRP measurement and reporting during the SCell activation process when reliable beam information (e.g., TCI information) is not available for L1-RSRP measurements during SCell activation.

There is a number of example embodiments described herein.

Example 1 is a baseband processor of a user equipment (UE) configured to perform operations comprising: determining, during secondary cell (SCell) activation, that beam information to enable the UE to make a reliable layer 1 (L1)-Reference Signal Received Power (RSRP) measurement is unavailable; performing, when the beam information to enable the UE to make the reliable L1-RSRP measurement is unavailable, the L1-RSRP measurement using information of one or more Synchronization Signal Blocks (SSBs) during the SCell activation, wherein performing the L1-RSRP measurement using information of one or more SSBs during the SCell activation comprises identifying, by the UE, one or more detectable SSBs during the SCell activation and using information of the one or more detectable SSBs for the L1-RSRP measurement; and reporting, by the UE after SCell synchronization, the L1-RSRP measurement using information of one or more SSBs in a L1-RSRP measurement report for the SCell activation as a replacement.

Example 2 is the baseband processor of example 1 that may optionally include that reporting of the alternative information comprises reporting, by the UE, the L1-RSRP with an SSB index associated with each measurement.

Example 3 is the baseband processor of example 1 that may optionally include that reporting the alternative information comprises identifying one receive beam for each detectable SSB reception that is determined to have a better quality than all other receive beams for said each detectable SSB reception.

Example 4 is the baseband processor of example 1 that may optionally include that determining, during SCell activation, that beam information to enable the UE to make the reliable L1-RSRP measurement report is unavailable comprises determining the SCell being activated belongs to Frequency Range 2 (FR2) and that the SCell is unknown to the UE.

Example 5 is the baseband processor of example 4 that may optionally include that the alternative information is provided in the L1-RSRP measurement report as the replacement when the SCell being activated belongs to FR2 and the SCell is unknown to the UE.

Example 6 is the baseband processor of example 1 that may optionally include that the alternative information is used as a replacement when transmission configuration indicator (TCI) information of a certain quality level is not available to enable the UE to make a reliable L1-RSRP measurement report.

Example 7 is the baseband processor of example 1 that may optionally include that identifying the one or more detectable SSBs during the SCell activation comprises using SSBs that are used for SCell synchronization when the UE is synchronizing with a target SCell.

Example 8 is a method to acquire TCI information for secondary cell (SCell) activation, the method comprising: determining, during secondary cell (SCell) activation, that beam information to enable a user equipment (UE) to make a reliable L1-RSRP measurement is unavailable; performing, when the beam information to enable the UE to make the reliable L1-RSRP measurement is unavailable, the L1-RSRP measurement using information of one or more Synchronization Signal Blocks (SSBs) during the SCell activation, wherein performing the L1-RSRP measurement using information of one or more SSBs during the SCell activation comprises identifying, by the UE, one or more detectable SSBs during the SCell activation, and using information of the one or more detectable SSBs for the L1-RSRP measurement; and reporting, by the UE after SCell synchronization, the L1-RSRP measurement using information of one or more SSBs in a L1-RSRP measurement report for the SCell activation as a replacement.

Example 9 is the method of example 8 that may optionally include that the reporting of the alternative information comprises reporting, by the UE, the L1-RSRP with an SSB index associated with each measurement.

Example 10 is the method of example 8 that may optionally include that reporting the alternative information comprises identifying one receive beam for each detectable SSB reception that is determined to have a better quality than all other receive beams for said each detectable SSB reception.

Example 11 is the method of example 8 that may optionally include that determining, during SCell activation, that beam information to enable the UE to make the reliable L1-RSRP measurement report is unavailable comprises determining the SCell being activated belongs to Frequency Range 2 (FR2) and that the SCell is unknown to the UE.

Example 12 is the method of example 11 that may optionally include that the alternative information is provided in the L1-RSRP measurement report as the replacement when the SCell being activated belongs to FR2 and the SCell is unknown to the UE.

Example 13 is the method of example 8 that may optionally include that the alternative information is used as a replacement when transmission configuration indicator (TCI) information of a certain quality level is not available to enable the UE to make a reliable L1-RSRP measurement report.

Example 14 is the method of example 8 that may optionally include that identifying the one or more detectable SSBs during the SCell activation comprises using SSBs that are used for SCell synchronization when the UE is synchronizing with a target SCell.

Example 15 is a UE device comprising: at least one antenna; at least one radio, wherein the at least one radio is to perform cellular communications using a radio access technology that establishes a wireless link with a base station; and one or more processors to: determine, during secondary cell (SCell) activation, that beam information to enable a user equipment (UE) to make a reliable L1-RSRP measurement is unavailable; perform, when the beam information to enable the UE to make the reliable L1-RSRP measurement is unavailable the L1-RSRP measurement using information of one or more Synchronization Signal Blocks (SSBs) during the SCell activation, wherein the one or more processors perform the L1-RSRP measurement using information of one or more SSBs during the SCell activation by identifying, by the UE, one or more detectable SSBs during the SCell activation and using information of the one or more detectable SSBs for the L1-RSRP measurement; and report, by the UE after SCell synchronization, the L1-RSRP measurement using information of one or more SSBs in a L1-RSRP measurement report for the SCell activation as a replacement.

Example 16 is the UE device of example 15 that may optionally include that the one or more processors report of the alternative information by reporting the L1-RSRP with an SSB index associated with each measurement.

Example 17 is the UE device of example 15 that may optionally include that the one or more processors report the alternative information by identifying one receive beam for each detectable SSB reception that is determined to have a better quality than all other receive beams for said each detectable SSB reception.

Example 18 is the UE device of example 15 that may optionally include that determining, during SCell activation, that beam information to enable the UE to make the reliable L1-RSRP measurement report is unavailable comprises determining the SCell being activated belongs to Frequency Range 2 (FR2) and that the SCell is unknown to the UE.

Example 19 is the UE device of example 18 that may optionally include that the alternative information is provided in the L1-RSRP measurement report as the replacement when the SCell being activated belongs to FR2 and the SCell is unknown to the UE.

Example 20 is the UE device of example 15 that may optionally include that the alternative information is used as a replacement when transmission configuration indicator (TCI) information of a certain quality level is not available to enable the UE to make a reliable L1-RSRP measurement report.

Example 21 is a baseband processor configured to perform operations comprising: determining, during secondary cell (SCell) activation, that beam information to enable a user equipment (UE) to make a reliable layer 1 (L1)-Reference Signal Received Power (RSRP) measurement is unavailable; performing, when the beam information to enable the UE to make the reliable L1-RSRP measurement is unavailable, the L1-RSRP measurement using preconfigured TCI information for L1-RSRP that is preconfigured by a network during the SCell activation; and reporting, by the UE after SCell synchronization, L1-RSRP measurement using the preconfigured TCI information in a L1-RSRP measurement report for the SCell activation as a replacement.

Example 22 is the baseband processor of example 21 that may optionally include that the operations further comprise configuring, by the network, at least a portion of L1-RSRP reference signals (RSs) and each L1-RSRP RS is QCL type D with one SSB.

Example 23 is a method to acquire TCI information for secondary cell (SCell) activation, the method comprising: determining, during secondary cell (SCell) activation, that beam information to enable a user equipment (UE) to make a reliable L1-RSRP measurement is unavailable; performing, when the beam information to enable the UE to make the reliable L1-RSRP measurement is unavailable, the L1-RSRP measurement using preconfigured TCI information for L1-RSRP that is preconfigured by a network during the SCell activation and reporting, by the UE after SCell synchronization, L1-RSRP measurement using the preconfigured TCI information in a L1-RSRP measurement report for the SCell activation as a replacement.

Example 24 is the method of example 23 that may optionally include configuring, by the network, at least a portion of L1-RSRP reference signals (RSs) and each L1-RSRP RS is QCL type D with one SSB.

Example 25 is a UE device comprising: at least one antenna; at least one radio, wherein the at least one radio is to perform cellular communications using a radio access technology that establishes a wireless link with a base station; and one or more processors to: determine, during secondary cell (SCell) activation, that beam information to enable a user equipment (UE) to make a reliable L1-RSRP measurement is unavailable; perform, when the beam information to enable the UE to make the reliable L1-RSRP measurement is unavailable, the L1-RSRP measurement using preconfigured TCI information for L1-RSRP that is preconfigured by a network during the SCell activation; and report, by the UE after SCell synchronization, L1-RSRP measurement using the preconfigured TCI information in a L1-RSRP measurement report for the SCell activation as a replacement.

Example 26 is the UE device of example 25 that may optionally include that the network configures at least a portion of L1-RSRP reference signals (RSs) and each L1-RSRP RS is QCL type D with one SSB.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A baseband processor of a user equipment (UE) configured to perform operations comprising:
    determining, during secondary cell (SCell) activation, that beam information to enable the UE to make a reliable layer 1 (L1)-Reference Signal Received Power (RSRP) measurement for beam reporting is unavailable;
    performing, when the beam information to enable the UE to make the reliable L1-RSRP measurement is unavailable, the L1-RSRP measurement using information of one or more Synchronization Signal Blocks (SSBs) during the SCell activation, wherein performing the L1-RSRP measurement using information of one or more SSBs during the SCell activation comprises:
        identifying, by the UE, one or more detectable SSBs when synchronizing during the SCell activation, and using information of the one or more detectable SSBs for the L1-RSRP measurement; and
    reporting, by the UE after SCell synchronization, the L1-RSRP measurement using information of the one or more detectable SSBs as alternative information for beam reporting in a L1-RSRP measurement report for the SCell activation as a replacement.

2. The baseband processor defined in claim 1 wherein reporting of the alternative information comprises reporting, by the UE, the L1-RSRP with an SSB index associated with each measurement.

3. The baseband processor defined in claim 1 wherein reporting the alternative information comprises identifying one receive beam for each detectable SSB reception that is determined to have a better quality than all other receive beams for said each detectable SSB reception.

4. The baseband processor defined in claim 1 wherein determining, during SCell activation, that beam information to enable the UE to make the reliable L1-RSRP measurement report is unavailable comprises determining the SCell being activated belongs to Frequency Range 2 (FR2) and that the SCell is unknown to the UE.

5. The baseband processor defined in claim 4 wherein the alternative information is provided in the L1-RSRP measurement report as the replacement when the SCell being activated belongs to FR2 and the SCell is unknown to the UE.

6. The baseband processor defined in claim 1 wherein the alternative information is used as a replacement when transmission configuration indicator (TCI) information of a certain quality level is not available to enable the UE to make a reliable L1-RSRP measurement report.

7. The baseband processor defined in claim 1 wherein identifying the one or more detectable SSBs during the SCell activation comprises using SSBs that are used for SCell synchronization when the UE is synchronizing with a target SCell.

8. A method to acquire TCI information for secondary cell (SCell) activation, the method comprising:
    determining, during secondary cell (SCell) activation, that beam information to enable a user equipment (UE) to make a reliable L1-RSRP measurement for beam reporting is unavailable;
    performing, when the beam information to enable the UE to make the reliable L1-RSRP measurement is unavailable, the L1-RSRP measurement using information of one or more Synchronization Signal Blocks (SSBs) during the SCell activation, wherein performing the L1-RSRP measurement using information of one or more SSBs during the SCell activation comprises
        identifying, by the UE, one or more detectable SSBs when synchronizing during the SCell activation, and using information of the one or more detectable SSBs for the L1-RSRP measurement; and
    reporting, by the UE after SCell synchronization, the L1-RSRP measurement using information of the one or more detectable SSBs as alternative information for beam reporting in a L1-RSRP measurement report for the SCell activation as a replacement.

9. The method defined in claim 8 wherein the reporting of the alternative information comprises reporting, by the UE, the L1-RSRP with an SSB index associated with each measurement.

10. The method defined in claim 8 wherein reporting the alternative information comprises identifying one receive beam for each detectable SSB reception that is determined to have a better quality than all other receive beams for said each detectable SSB reception.

11. The method defined in claim 8 wherein determining, during SCell activation, that beam information to enable the UE to make the reliable L1-RSRP measurement report is unavailable comprises determining the SCell being activated belongs to Frequency Range 2 (FR2) and that the SCell is unknown to the UE.

12. The method defined in claim 11 wherein the alternative information is provided in the L1-RSRP measurement report as the replacement when the SCell being activated belongs to FR2 and the SCell is unknown to the UE.

13. The method defined in claim 8 wherein the alternative information is used as a replacement when transmission configuration indicator (TCI) information of a certain quality level is not available to enable the UE to make a reliable L1-RSRP measurement report.

14. The method defined in claim 8 wherein identifying the one or more detectable SSBs during the SCell activation comprises using SSBs that are used for SCell synchronization when the UE is synchronizing with a target SCell.

15. A user equipment device comprising:
    at least one antenna;
    at least one radio, wherein the at least one radio is to perform cellular communications using a radio access technology that establishes a wireless link with a base station; and
    one or more processors to:
        determine, during secondary cell (SCell) activation, that beam information to enable a user equipment (UE) to make a reliable L1-RSRP measurement for beam reporting is unavailable;
        perform, when the beam information to enable the UE to make the reliable L1-RSRP measurement is unavailable, the L1-RSRP measurement using information of one or more Synchronization Signal Blocks (SSBs) during the SCell activation, wherein the one or more processors perform the L1-RSRP measurement using information of one or more SSBs during the SCell activation by identifying, by the UE, one or more detectable SSBs when synchronizing during the SCell activation and using information of the one or more detectable SSBs for the L1-RSRP measurement; and report, by the UE after SCell synchronization, the L1-RSRP measurement using information of the one or more detectable SSBs as alternative information for beam reporting in a L1-RSRP measurement report for the SCell activation as a replacement.

16. The UE device defined in claim 15 wherein the one or more processors report of the alternative information by reporting the L1-RSRP with an SSB index associated with each measurement.

17. The UE device defined in claim 15 wherein the one or more processors report the alternative information by identifying one receive beam for each detectable SSB reception that is determined to have a better quality than all other receive beams for said each detectable SSB reception.

18. The UE device defined in claim 15 wherein determining, during SCell activation, that beam information to enable the UE to make the reliable L1-RSRP measurement report is unavailable comprises determining the SCell being activated belongs to Frequency Range 2 (FR2) and that the SCell is unknown to the UE.

19. The UE device defined in claim 18 wherein the alternative information is provided in the L1-RSRP measurement report as the replacement when the SCell being activated belongs to FR2 and the SCell is unknown to the UE.

20. The UE device defined in claim 15 wherein the alternative information is used as a replacement when transmission configuration indicator (TCI) information of a certain quality level is not available to enable the UE to make a reliable L1-RSRP measurement report.

* * * * *